United States Patent [19]

Mongeon et al.

[11] Patent Number: 4,716,444
[45] Date of Patent: Dec. 29, 1987

[54] OPTICAL RADAR TRANSCEIVER CONTROL APPARATUS

[75] Inventors: Robert J. Mongeon, S. Windsor; Robert J. Wayne, Manchester; Robert W. Henschke, E. Hampton, all of Conn.

[73] Assignee: The United States of America as represented by the Secretary of the Army, Washington, D.C.

[21] Appl. No.: 761,257

[22] Filed: Aug. 1, 1985

[51] Int. Cl.[4] .................................... G01C 3/08
[52] U.S. Cl. .................................. 356/05; 356/152; 332/7.51; 372/32
[58] Field of Search .................... 356/5, 152, 285; 332/7.51; 372/18, 26, 28, 32; 340/942

[56] References Cited

U.S. PATENT DOCUMENTS

| | | | |
|---|---|---|---|
| 4,146,328 | 3/1979 | Hullein et al. | 356/5 |
| 4,215,936 | 8/1980 | Winocur | 356/152 |
| 4,240,746 | 12/1980 | Courtenay et al. | 356/5 |
| 4,329,664 | 5/1982 | Javan | 356/5 |
| 4,405,230 | 9/1983 | Tew et al. | 356/5 |
| 4,572,662 | 2/1986 | Silverman | 356/5 |

Primary Examiner—M. H. Paschall
Attorney, Agent, or Firm—Sheldon Kanars; Jeremiah G. Murray; Robert A. Maikis

[57] ABSTRACT

The apparatus is part of an optical radar set and comprises a high powered $CO_2$ pulsed transmitter laser which is injection controlled to operate at a fixed frequency offset from a lower powered $CO_2$ local oscillator laser. A portion of the output of the local oscillator laser is applied to an acousto-optic Bragg cell, together with an RF signal equal to the desired intermediate frequency of the radar set. The upshifted first order output of the Bragg cell is injected into the transmitter laser for stabilization purposes. This results in a stable intermediate frequency for the optical radar set.

2 Claims, 2 Drawing Figures

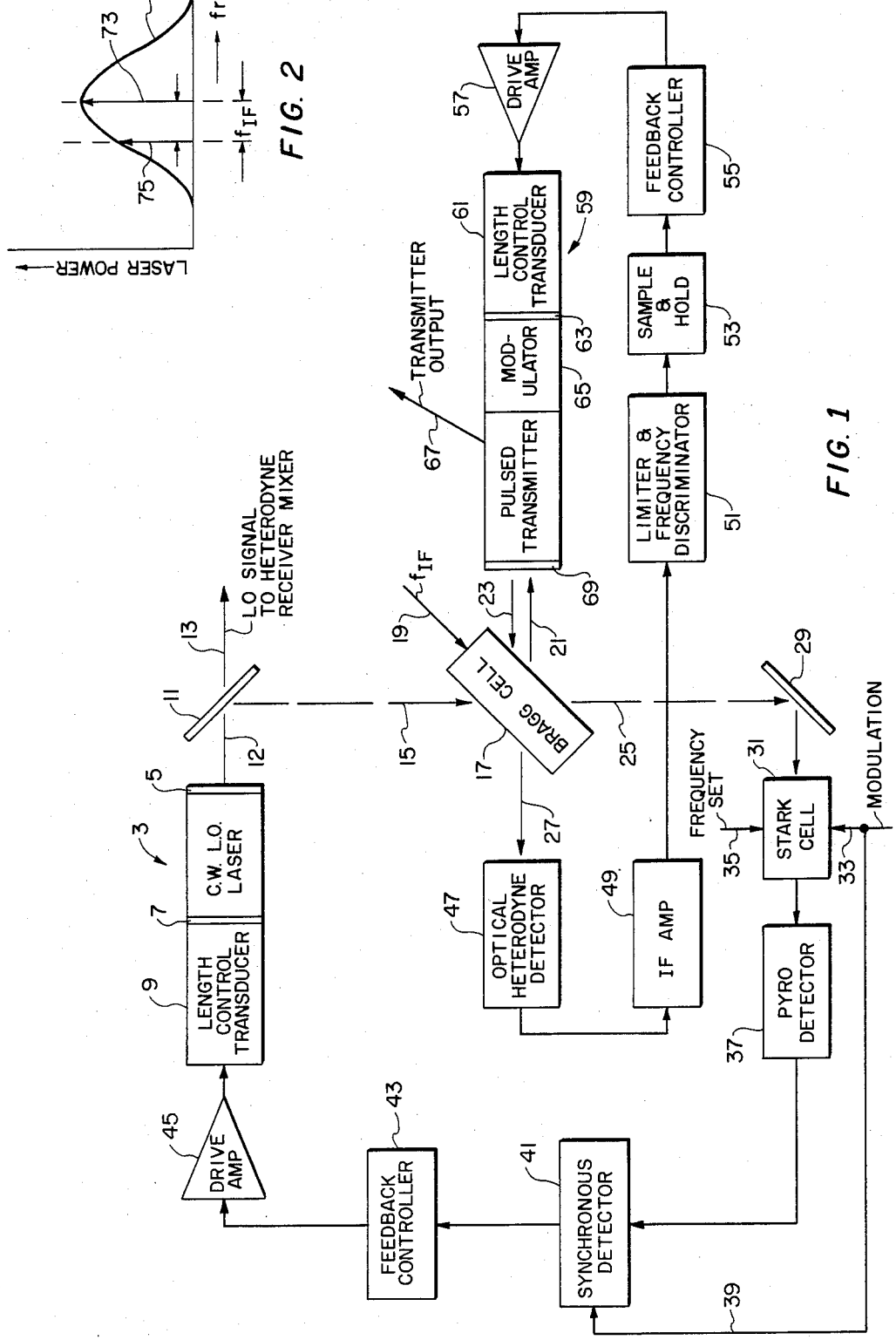
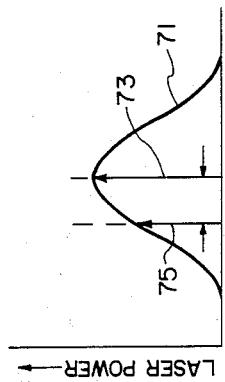
FIG. 2
FIG. 1

OPTICAL RADAR TRANSCEIVER CONTROL APPARATUS

The Government has rights in this invention pursuant to Contract DAAB07-76-C-0920, awarded by the Department of the Army.

BACKGROUND OF THE INVENTION

This invention relates to optical radar and more particularly to transceiver control apparatus which may be part of an airborne optical obstacle avoidance or target tracking radar set. Such radar sets are used in helicopters and other low flying aircraft to detect obstacles or track targets in the aircraft's flight path by transmitting forward of the craft a laser-generated coherent beam in the infra red region and detecting the echo signals from obstacles such as power lines, hills, trees and buildings.

Most optical radars of these types are of the heterodyne type in which the received optical signals are heterodyned in a mixer with the output of a laser local oscillator which has a fixed and controlled frequency which is offset from the laser transmitter's frequency. This results in an intermediate frequency signal in the output of the mixer which is equal to the aforementioned offset frequency. Target information such as range, target radial velocities and Doppler signatures of moving targets is obtained from the modulated intermediate frequency signals.

Heterodyne optical radars, especially those of the Doppler type, require laser transmitters and local oscillators which are highly stable in frequency and are controlled to operate at an accurate frequency offset so that the radar set's intermediate frequency is constant. Any frequency drift between the two laser frequencies will have the same affect on the intermediate frequency signal thereof as will radial target movement. Further, the high powered $CO_2$ transmitter lasers required for such radar sets necessarily involve moderate to large Fresnel number optical cavities which have inherently low temporal and modal stability. The temporal instability arises when the differential optical loss among competing high order transverse and longitudinal modes is low, resulting in random "mode hopping" and consequent random output frequency changes. Moreover, without some form of optical dispersion, a high power $CO_2$ l laser transmitter can oscillate on any number of vibrational-rotational transitions in the 9 to 11 micron spectral region, and while gratings or prisms may be employed to provide intracavity optical dispersion, these elements invariably add considerable optical loss.

Such inherently unstable large $CO_2$ lasers can be stabilized or controlled by injecting into the cavity thereof a small sample of the desired frequency, wavelength and mode of operation, as long as the high power laser cavity has the required optical design to support this frequency or wavelength of oscillation. Under these conditions, the injected signal will force the higher powered device to operate on the injected transition and transverse mode. The source of the injection signal is usually another smaller $CO_2$ laser, which has better temporal, modal and frequency stability due to its smaller cavity, and which can in addition be provided with an accurate frequency stabilization system, such as a feedback loop containing a Stark cell as a frequency reference.

A co-pending application entitled INJECTION CONTROLLED LASER TRANSMITTER WITH TWIN LOCAL OSCILLATORS, Ser. No. 704,816, filed on Feb. 25, 1985, now U.S. Pat. No. 4,655,588, issued Apr. 7, 1987, discloses and claims a heterodyne $CO_2$ optical Doppler radar comprising a ring type of transmitter laser with twin local oscillator lasers which are automatically controlled to operate at a frequency difference equal to the desired intermediate frequency of the optical radar. The output of one of the two lasers is injected onto the transmitter laser for stabilization purposes and the output of the other of the twin lasers is heterodyned with the received target return signals to form the radar's intermediate frequency signal.

The present invention comprises apparatus and circuitry which achieves stable operation of a high power pulsed laser transmitter and an accurately controlled intermediate frequency signal with the use of only a single local oscillator laser.

SUMMARY OF THE INVENTION

The apparatus and circuitry comprises a low powered continuous wave (CW) laser local oscillator which is provided with a frequency control loop including a Stark cell. A portion of the output of the local oscillator is frequency shifted by an amount equal to the desired intermediate frequency by means of a Bragg cell. The frequency shifted output of the Bragg cell is injected into a pulsed higher powered transmitter laser in order to stabilize the operation thereof. The transmitter laser includes a pulse modulating means such as an intracavity modulator or a Q switch, as well as an automatic length control system for continually tuning it for maximum power output. The laser transmitter is tuned or controlled to operate at its line center frequency where power output is maximized, with the local oscillator operating off line center by the amount of the intermediate frequency.

It is thus an object of the invention to provide a transceiver control apparatus and circuitry for an optical radar set comprising a continuous wave local oscillator laser which is Stark stabilized off of its line center by an amount equal to the desired intermediate frequency of the radar set, and in which an acousto-optic Bragg cell is utilized to provide a CW injection control signal for the pulsed higher powered laser transmitter. The Bragg cell also provides a CW optical signal for the Stark stabilization of the local oscillator and a composite optical output comprising a sample of the CW local oscillator and a sample of the pulsed transmitter output, which two sample signals are self heterodyned to provide a feedback signal which automatically varies the length of the transmitter cavity so that the transmitter laser is locked to the sum of the local oscillator and the acoustic frequency applied to the Bragg cell.

Another object of the invention is to provide an optical radar set with a pulsed transmitter which is injection controlled to operate at a fixed frequency offset from a local oscillator laser, said fixed frequency offset being obtained from an acousto-optic Bragg cell to which the output of said local oscillator is applied, together with an acoustic signal equal to the desired frequency offset between said local oscillator and the transmitter lasers.

A still further object of the invention is to provide an optical radar with a pulsed high powered, inherently unstable transmitter laser, which transmitter laser is provided with an injection control signal which is derived from a Stark-stabilized lowered powered CW local oscillator laser, the output of which is frequency shifted by the amount of the desired intermediate frequency of the radar set by means of an acousto-optic Bragg cell to which an RF signal equal to said intermediate frequency is applied.

These and other objects and advantages of the invention will become apparent from the following detailed description and the drawings.

BRIEF DESCRIPTION OF THE DRAWINGS

FIG. 1 is a diagram of the apparatus and circuitry of an illustrative embodiment of the invention.

FIG. 2 is a graph of the common laser power curves of the two lasers, showing the relationship of the two laser frequencies.

DETAILED DESCRIPTION OF A PREFERRED EMBODIMENT

In the diagram of FIG. 1, the local oscillator laser 3 comprises a cavity bounded on one end by a highly reflective mirror 7 which is attached to and moved by a length control transducer 9, and on the other end by an output mirror 5. The optical output, 12, of the local oscillator passes through partially reflective mirror 11 to form beam 13 which provides the local oscillator signal for the mixer (not shown) of the radar receiver. The portion of the beam 12 which is reflected from mirror 11 is referenced as 15 and it is applied to Bragg cell 17 as one input thereof. The Bragg cell is a prior art type of acoustic-optic device which can function as an optical modulator or mixer for infra red coherent optical signals of the type produced by $CO_2$ gas lasers. Such Bragg cells are standard commercial items and one source of such devices is the IntraAction Corp. of Bellwood, Ill. Such a Bragg cell may comprise, for example, a germanium monocrystal into which acoustic waves are launched from piezoelectric transducers bonded thereto and operating in the longitudinal acoustic mode. The acoustic waves traveling through the crystal vary the index of refraction thereof in a periodic manner and thus the crystal will appear as a thick diffraction grating to a laser beam as it passes therethrough. Such a thick diffraction grating will diffract the laser beam into higher order beams. For maximum diffraction into the first order, the laser beam must enter the crystal at its Bragg angle. The first order diffracted beam will be upshifted or downshifted from the incident laser beam frequency by the acoustic frequency applied to the Bragg cell transducers. Whether the first order output is up or down shifted depends on the angle of incidence of the incident laser beam relative to the direction of propagation of the acoustic waves in the crystal. The zero order output of such a Bragg cell comprises the input beam undeflected and unchanged in frequency while the aforementioned first order beam will be deflected by twice the Bragg angle from the first order beam and will be frequency shifted as explained above.

In FIG. 1, the Bragg cell 17 has an RF (radio frequency) electrical signal $f_{IF}$ applied to the transducers thereof via lead 19. This RF signal is the desired radar set's intermediate frequency and it may, for example, be in the VHF region and may be generated in a stable oscillator (not shown) which is part of the optical radar. The Bragg cell output beam 25 represents the zero order output resulting from the input beam 15. Unshifted beam 25 is applied to the Stark cell 31 after reflection from mirror 29. The Stark cell is part of an automatic frequency control loop which adjusts the length of the cavity of local oscillator laser 3 to stabilize the output thereof at the resonant frequency of the Stark cell. This feedback loop comprises, in addition to the Stark cell 31, a pyro detector 37 which converts the optical output of cell 31 to a corresponding electrical signal which is then applied to synchronous detector 41. The Stark cell includes two control inputs, one of which is frequency set input 35 which is a variable dc bias which adjusts the center frequency of the Stark cell to the desired frequency of local oscillator laser 3. The other control input 33 is an alternating modulating signal which varies the tuning of the Stark cell around the frequency set by input 35. This causes the output of detector 37 to vary in phase depending on the relative tuning of the Stark cell frequency reference and the frequency of local oscillator 3. The synchronous detector 41 detects the phase of the output of detector 37 by comparing it to the phase of the modulation signal applied thereto over lead 39, and produces a varying dc bias which is applied to length control transducer 9 and laser 3, via elements 43 and 45, to adjust the optical output thereof to match the tuning of the Stark cell. The feedback controller 43 provides desired control of the signal in the feedback loop and the drive amplifier 45 amplifies the feedback signal so that sufficient power will be available to operate length control transducer 9. Such Stark cell frequency stabilization loops are known in the art.

The pulsed laser transmitter 59 of the optical radar comprises a laser cavity bounded by mirrors 63 and 69. The mirror 63 is attached to and is driven by length control transducer 61. An intracavity modulator 65 may function as a Q-switch to produce pulses of optical energy required for the transmitted beam 67 of the radar. The first order output of Bragg cell 17 resulting from input beam 15 is designated as beam 21 and this beam is injected into transmitter laser 59 through mirror 69 for stabilization purposes. The injected beam 21 will be at the frequency of input beam 15 plus the frequency of the RF signal $f_{IF}$ applied to the Bragg cell from lead 19. The transmitter laser will thus be injection controlled to operate at a frequency which is above that of the local oscillator laser by the amount of the desired intermediate frequency, $f_{IF}$.

The pulsed transmitter laser is also provided with a frequency control loop which adjusts the cavity length thereof for maximum optical output at its line center. A small portion of the pulsed output of laser 59 passes through cavity mirror 69 as beam 23 which passes through the Bragg cell and emerges therefrom as beam 27. This output beam 27 will comprise both the zero and first order components due to the pulsed input beam 23. These two pulsed beam component will differ in frequency by $f_{IF}$. The beam 27 is applied to optical heterodyne detector 47 where the two beam components are heterodyned with each other to produce a difference frequency electrical signal at $f_{IF}$. This signal is applied to IF amplifier 49 which comprises an amplifier tuned to $f_{IF}$. The output of amplifier 49 is applied to limiter and frequency discriminator 51 which limits the intermediate frequency signal and applies it to a discriminator which has a center frequency equal to $f_{IF}$. The pulsed and variable dc output of the frequency discriminator 51 is applied to sample and hold circuit 53 which converts it to a non-pulsed dc bias having an amplitude equal to the loop frequency error and a polarity which depends on the sense of the frequency error. The output of circuit 53 is applied to length control transducer 61 via feedback controller 55 and drive amplifier 57, which perform the same functions as the circuit elements 43 and 45 of the local oscillator frequency control loop.

The curve 71 of FIG. 2 is the laser power curve of both of the lasers of FIG. 1. Both lasers are provided with the same lasing gaseous medium at the same pressure and both operate on the same vibrational-rotational transition, thus both will exhibit the same power curve. Since the lasers operate at different frequencies, only one can operate at the line center and since the transmitter laser should operate at maximum power, it is arranged to operate at the line center, with the local oscillator laser operating off of the line center by the amount of the intermediate frequency. In FIG. 2 the frequencies of both of the lasers are indicated by vertical lines, the transmitter laser by line 73 at the line center and the local oscillator laser by line 75, which is below the line center by $f_{IF}$. The local oscillator laser could be arranged to operate above the frequency of the transmitter laser by the amount of the intermediate frequency. This would be accomplished by selecting the down-shifted first order output of the Bragg cell for injection control of the transmitter laser.

Since the beam 25 emerges from Bragg cell 17 without any change in frequency, this beam could be obtained directly from the local oscillator laser output, for example by diverting a portion of beam 15 by means of another partially reflective mirror similar to mirror 11.

While the invention has been described in connection with illustrative embodiments, obvious variations therein will be apparent to those skilled in the art, accordingly the invention should be limited only by the scope of the appended claims.

What is claimed is:

1. Optical radar transceiver control apparatus of the heterodyne type comprising a pulsed transmitted laser, said transmitter laser having an intracavity modulator for pulse modulation thereof;

a continuous wave local oscillator laser, said local oscillator laser having a lower power output than said transmitter laser and operating on substantially the same power curve as said transmitter laser;

an acousto-optic Bragg cell having a Bragg angle input, a non-Bragg angle input, a transducer input, a first output at which a zero order output signal appears which has the same frequency as the signal applied to said Bragg angle input, a second output at which a first order output signal appears which has a frequency equal to the sum of the frequencies of signals applied to said Bragg angle input and said transducer input, and a third output at which a signal appears which has zero and first order components of a signal applied to said non-Bragg angle input;

means for coupling said Bragg cell Bragg angle input to receive at least a portion of the output beam from said local oscillator laser;

means for coupling said Bragg cell non-Bragg angle input to receive at least a portion of the output beam from said transmitter laser;

means for coupling said Bragg cell transducer input to a RF signal having a frequency equal to the desired intermediate frequency at which the heterodyne apparatus is to operate;

means for coupling said Bragg cell first output to first frequency control means for stabilizing the optical output frequency of said local oscillator laser at a frequency which differs from the line center frequency of said laser power curve by an amount equal to said desired intermediate frequency;

means for coupling said Bragg cell second output to said transmitter laser for injection control of said transmitter laser by said Bragg cell first order output signal; and means for coupling said Bragg cell third output to second frequency control means for controlling the length of the cavity of said transmitter laser to cause said transmitter laser to operate at the line center frequency of said laser power curve.

2. Apparatus as claimed in claim 1 wherein said first frequency control means has a Stark cell as a frequency reference.

* * * * *